United States Patent
Lee et al.

(10) Patent No.: US 10,405,271 B2
(45) Date of Patent: Sep. 3, 2019

(54) METHOD AND APPARATUS FOR SELECTING ACCESS NETWORK IN WIRELESS COMMUNICATION SYSTEM

(71) Applicant: Samsung Electronics Co., Ltd., Suwon-si, Gyeonggi-do (KR)

(72) Inventors: Okseon Lee, Suwon-si (KR); Sinseok Seo, Montigny-le-Bretonneux (FR); Youngsuk Sun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/792,282

(22) Filed: Oct. 24, 2017

(65) Prior Publication Data

US 2018/0115945 A1    Apr. 26, 2018

(30) Foreign Application Priority Data

Oct. 25, 2016 (KR) .................. 10-2016-0139469

(51) Int. Cl.
*H04W 48/18* (2009.01)
*H04W 24/02* (2009.01)

(52) U.S. Cl.
CPC .......... *H04W 48/18* (2013.01); *H04W 24/02* (2013.01); *Y02D 70/00* (2018.01); *Y02D 70/10* (2018.01); *Y02D 70/12* (2018.01); *Y02D 70/126* (2018.01); *Y02D 70/1262* (2018.01); *Y02D 70/21* (2018.01)

(58) Field of Classification Search
CPC .................................................. H04W 48/18
USPC ................... 455/435.1, 435, 2, 343.2–5, 453
See application file for complete search history.

(56) References Cited

U.S. PATENT DOCUMENTS

| | | |
|---|---|---|
| 6,748,246 B1 | 6/2004 | Khullar |
| 6,965,948 B1 | 11/2005 | Eneborg et al. |
| 7,143,171 B2 | 11/2006 | Eriksson et al. |
| 7,236,784 B2 | 6/2007 | Johannesson et al. |
| 7,436,843 B2 | 10/2008 | Gustafsson et al. |
| 7,460,856 B2 | 12/2008 | Sundberg |

(Continued)

FOREIGN PATENT DOCUMENTS

| | | |
|---|---|---|
| EP | 2 961 224 A1 | 12/2015 |
| JP | 2004-362020 A | 12/2004 |

OTHER PUBLICATIONS

European Search Report dated Jul. 11, 2019, issued in European Patent Application No. 17863397.0.

*Primary Examiner* — Congvan Tran
(74) *Attorney, Agent, or Firm* — Jefferson IP Law, LLP

(57) ABSTRACT

The present disclosure relates to a system and method to consider a data request and based thereon, select an access network that ensures battery life in a pre-5th-generation (5G) or 5G communication system to be provided for supporting higher data rates Beyond 4th-generation (4G) communication system such as long term evolution (LTE). An operating method of a terminal is provided that determines whether a data request occurs, then estimates a requested data amount when the data request occurs, and selects an access network, based on the estimated data amount. A terminal is also provided that includes a transceiver and at least one processor that exchanges communications with a server or base station and in doing so, determines whether a data request occurs, estimates a requested data amount when the data request occurs, and selects an access network, based on the estimated data amount.

20 Claims, 12 Drawing Sheets

(56) References Cited

U.S. PATENT DOCUMENTS

| | | |
|---|---|---|
| 7,756,068 B2 | 7/2010 | Tao et al. |
| 7,848,756 B2 | 12/2010 | Nader et al. |
| 7,957,350 B2 | 6/2011 | Oulai et al. |
| 7,983,241 B2 | 7/2011 | Furuskar et al. |
| 8,112,111 B2 | 2/2012 | Pettersson et al. |
| 8,189,607 B2 | 5/2012 | Kuparinen et al. |
| 8,200,820 B2 | 6/2012 | Prytz et al. |
| 8,346,315 B2 | 1/2013 | Lindoff et al. |
| 8,396,480 B2 | 3/2013 | Prytz et al. |
| 8,400,914 B2 | 3/2013 | Sachs et al. |
| 8,644,190 B2 | 2/2014 | Sachs et al. |
| 8,750,188 B2 | 6/2014 | Nicoara et al. |
| 8,811,201 B2 | 8/2014 | Sachs et al. |
| 8,867,567 B2 | 10/2014 | Sachs et al. |
| 9,008,735 B2 | 4/2015 | Annavaram et al. |
| 9,198,114 B2 | 11/2015 | Rune et al. |
| 9,288,733 B2 | 3/2016 | Dimou et al. |
| 9,319,975 B2 | 4/2016 | Ferraro Esparza et al. |
| 9,319,978 B2 | 4/2016 | Wang |
| 2002/0039367 A1 | 4/2002 | Seppala et al. |
| 2002/0039892 A1 | 4/2002 | Lindell |
| 2002/0068574 A1 | 6/2002 | Vestergaard et al. |
| 2003/0212798 A1 | 11/2003 | Furuskar et al. |
| 2004/0208144 A1 | 10/2004 | Vinayakray-Jani |
| 2006/0084417 A1 | 4/2006 | Melpignano et al. |
| 2006/0229068 A1 | 10/2006 | Niemela et al. |
| 2006/0259951 A1 | 11/2006 | Forssell et al. |
| 2007/0091851 A1 | 4/2007 | Simonsson et al. |
| 2007/0178933 A1 | 8/2007 | Nelson |
| 2007/0275717 A1 | 11/2007 | Edge et al. |
| 2008/0310419 A1 | 12/2008 | Bansal et al. |
| 2009/0213751 A1 | 8/2009 | Langefeld et al. |
| 2010/0035610 A1 | 2/2010 | Narang et al. |
| 2010/0074204 A1* | 3/2010 | Meylan ............... H04L 1/1822 370/329 |
| 2010/0184440 A1 | 7/2010 | Mao et al. |
| 2011/0055611 A1 | 3/2011 | Sharma et al. |
| 2011/0128907 A1 | 6/2011 | Kvernvik |
| 2011/0197081 A1 | 8/2011 | Dove |
| 2011/0235583 A1 | 9/2011 | Park |
| 2011/0282985 A1 | 11/2011 | Krantz et al. |
| 2012/0028670 A1 | 2/2012 | Lim |
| 2012/0122514 A1 | 5/2012 | Cheng et al. |
| 2012/0140651 A1 | 6/2012 | Nicoara et al. |
| 2012/0198251 A1 | 8/2012 | Boldryev et al. |
| 2012/0309397 A1 | 12/2012 | Rao et al. |
| 2013/0102313 A1 | 4/2013 | Tinnakornsrisuphap et al. |
| 2013/0115956 A1 | 5/2013 | Ewert et al. |
| 2013/0260757 A1 | 10/2013 | Deivasigamani et al. |
| 2013/0275794 A1 | 10/2013 | Annavaram et al. |
| 2013/0329639 A1 | 12/2013 | Wietfeldt et al. |
| 2014/0003263 A1 | 1/2014 | Sheriff |
| 2014/0003342 A1 | 1/2014 | Sheriff et al. |
| 2014/0162632 A1 | 6/2014 | Gajula et al. |
| 2014/0247731 A1 | 9/2014 | Nagaraj |
| 2014/0269495 A1 | 9/2014 | Frantz et al. |
| 2014/0323087 A1 | 10/2014 | Huang et al. |
| 2015/0005023 A1 | 1/2015 | Wang et al. |
| 2015/0043404 A1* | 2/2015 | Sergeyev ............... H04W 76/14 370/311 |
| 2015/0103754 A1 | 4/2015 | Prokopenko et al. |
| 2015/0189557 A1 | 7/2015 | Touati et al. |
| 2015/0271690 A1 | 9/2015 | Vashi et al. |
| 2015/0288593 A1* | 10/2015 | Campbell ......... G06F 17/30899 709/224 |
| 2015/0341855 A1 | 11/2015 | Bergman et al. |
| 2015/0351013 A1 | 12/2015 | Zhang et al. |
| 2015/0358757 A1 | 12/2015 | Ford et al. |
| 2015/0365875 A1 | 12/2015 | Stalnacke et al. |
| 2016/0014699 A1 | 1/2016 | Liu et al. |
| 2016/0057678 A1 | 2/2016 | Salkintzis |
| 2016/0073450 A1 | 3/2016 | Vikberg et al. |
| 2016/0095046 A1 | 3/2016 | Tervonen et al. |
| 2016/0095050 A1 | 3/2016 | Lindheimer et al. |
| 2016/0105830 A1 | 4/2016 | Chin et al. |
| 2016/0150255 A1 | 5/2016 | Grinshpun et al. |
| 2016/0198209 A1 | 7/2016 | Gray et al. |
| 2017/0359272 A1* | 12/2017 | Srinivasan ............... H04L 12/10 |
| 2018/0007630 A1* | 1/2018 | Nacer ............... H04W 52/0235 |

* cited by examiner

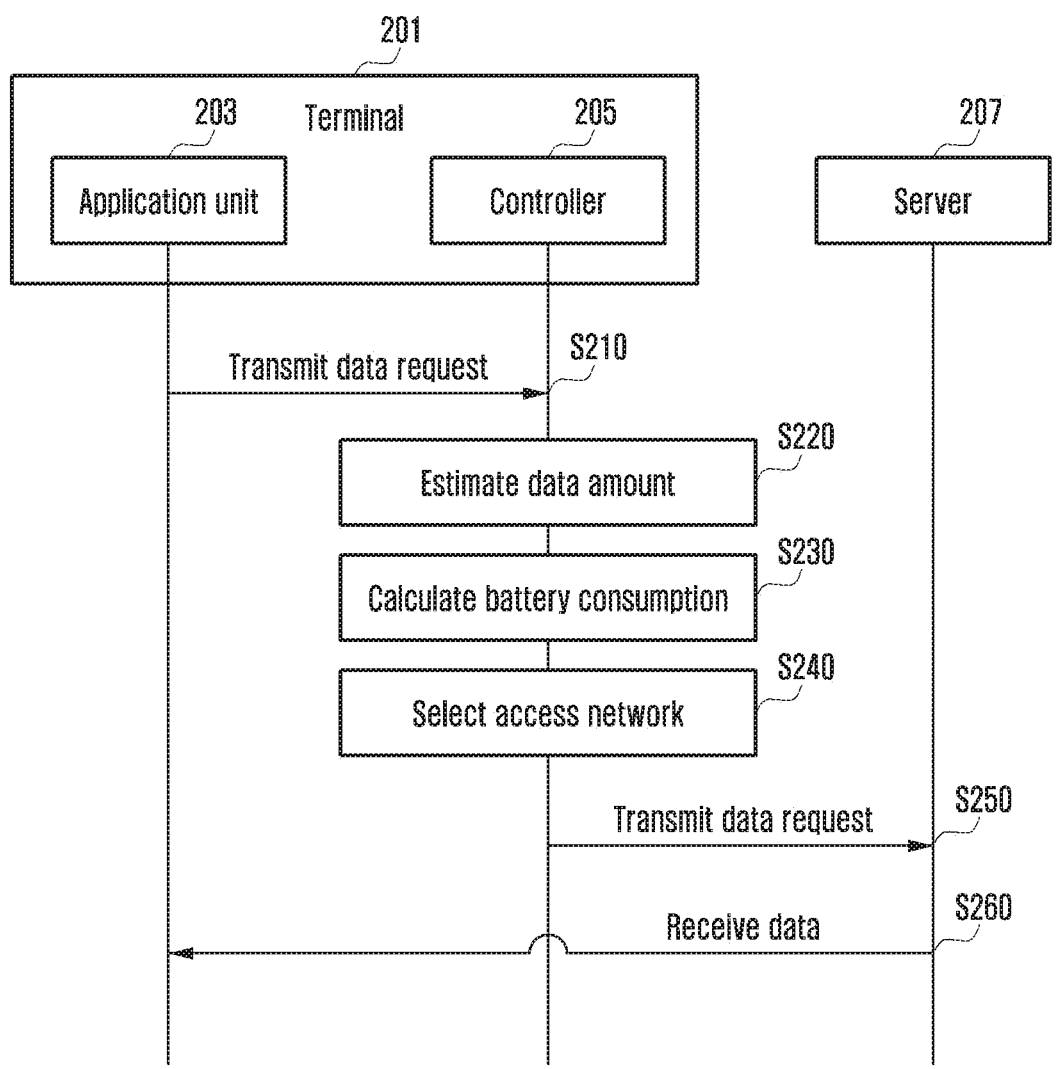

METHOD AND APPARATUS FOR SELECTING ACCESS NETWORK IN WIRELESS COMMUNICATION SYSTEM

CROSS-REFERENCE TO RELATED APPLICATION(S)

This application claims the benefit under 35 U.S.C. § 119(a) of a Korean patent application filed on Oct. 25, 2016 in the Korean Intellectual Property Office and assigned Serial number 10-2016-0139469, the entire disclosure of which is hereby incorporated by reference.

TECHNICAL FIELD

The present disclosure relates to a method and apparatus for selecting an access network in a wireless communication system. More particularly, the present disclosure relates to a method for a terminal to select a network with the smallest battery consumption in a situation where the terminal can access a plurality of networks.

BACKGROUND

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a 'Beyond 4G Network' or a 'Post long term evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antennas, analog beam forming, and large scale antenna techniques, are discussed in 5G communication systems.

In addition, in 5G communication systems, development for system network improvement is underway based on advanced small cells, cloud radio access networks (RANs), ultra-dense networks, device-to-device (D2D) communications, wireless backhaul, moving networks, cooperative communications, coordinated multi-points (CoMP), reception-end interference cancellation, and the like.

In the 5G system, Hybrid FSK, QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology, have been developed. Meanwhile, in current wireless communication systems, a terminal typically processes data traffic through a default radio access technology (RAT), and may change the accessed RAT when the access is unstable. However, battery consumption may increase if the 5G network is used as the default RAT.

In addition, battery consumption of the terminal may increase when the 5G network is used as the default access network without considering the type of application executed in the terminal, the characteristics of service provided to the terminal, and difference in power consumption between access networks. Also, when the 5G network is used as the default access network without considering a traffic pattern of data provided to the terminal, battery consumption may also increase.

Therefore, there is a need for a method of checking the power consumption of each access network in consideration of the type of application executed in the terminal, the characteristics of service, traffic pattern, and the like, and then selecting a network having the smallest battery consumption of the terminal.

The above information is presented as background information only, and to assist with an understanding of the present disclosure. No determination has been made, and no assertion is made, as to whether any of the above might be applicable as prior art with regard to the present disclosure.

SUMMARY

Aspects of the present disclosure are to address the above-mentioned problems or disadvantages, and to provide at least the advantages described below. Accordingly, an aspect of the present disclosure is to provide a method and apparatus for estimating traffic volume of a terminal, calculating battery consumption of the terminal for processing such traffic with respect to each network, and selecting a network having the smallest battery consumption.

In accordance with an aspect of the present disclosure, a method of controlling a terminal is provided. The method includes determining whether a data request occurs, estimating a requested data amount when the data request occurs, and selecting an access network, based on the estimated data amount.

In accordance with another aspect of the present disclosure, a terminal is provided. The terminal includes a transceiver configured to transmit and receive a signal, and a controller including at least one processor configured to determine whether a data request occurs, estimate a requested data amount when the data request occurs, and select an access network, based on the estimated data amount.

The terminal may reduce battery consumption by selecting an access network based on the amount of traffic. In addition, it is possible to prevent delay occurring while a buffer is filled in the case of selecting a network according to the actual data generation amount.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 2 is a diagram illustrating a method for a terminal to select a network according to an embodiment of the present disclosure;

Throughout the drawings, it should be noted that like reference numbers are used to depict the same or similar elements, features, and structures.

DETAILED DESCRIPTION

Figure 1A:
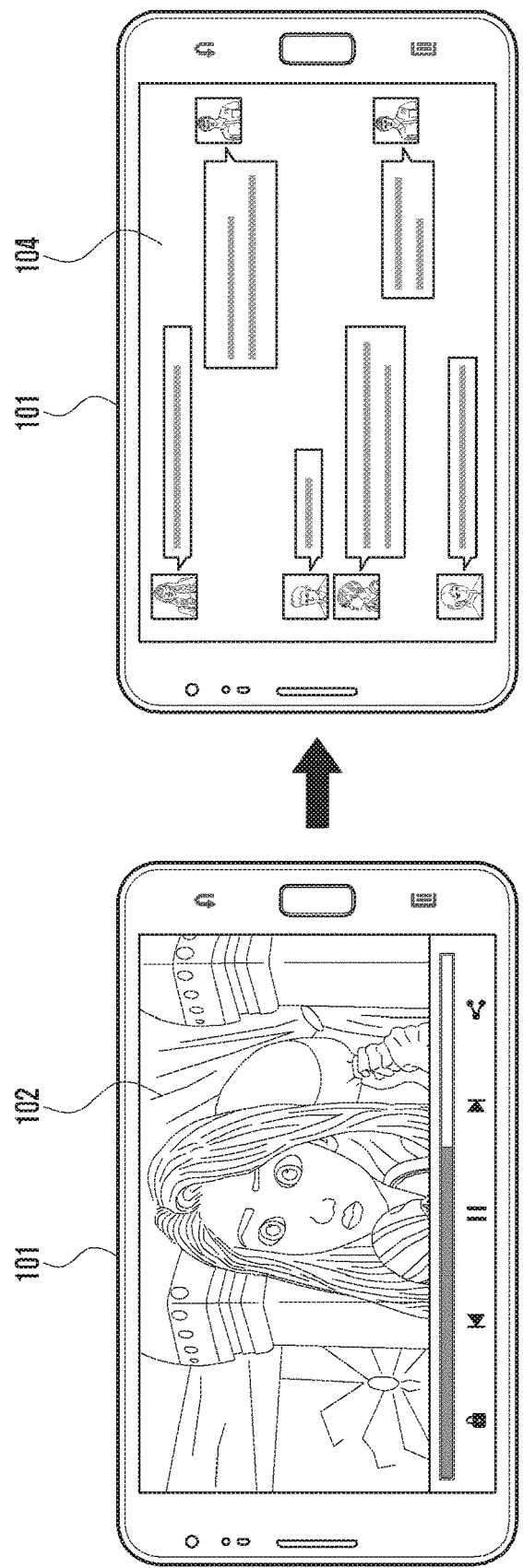
FIGS. 1A and 1B are diagrams illustrating a need of selecting an access network according to an embodiment of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the spirit and scope of the present disclosure. In addition, descriptions of well-known functions and constructions may be omitted for clarity and conciseness.

The terms and words used in the following description and claims are not limited to the bibliographical meanings, but are merely used to enable a clear and consistent understanding of the present disclosure. Accordingly, it should be apparent to those skilled in the art that the following description of various embodiments of the present disclosure is provided for illustration purpose only, and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, some elements are exaggerated, omitted or schematically shown in the accompanying drawings. Also, the size of each element does not entirely reflect the actual size.

The advantages and features of the present disclosure and the manner of achieving them will become apparent with reference to the embodiments described in detail below with reference to the accompanying drawings. The present disclosure may, however, be embodied in many different forms and should not be construed as limited to the embodiments set forth herein. Rather, these embodiments are provided so that this disclosure will be thorough and complete, and will fully convey the scope of the disclosure to those skilled in the art.

It will be understood that each block of flowchart illustrations, and combinations of blocks in flowchart illustrations and the like, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block or blocks. These computer program instructions may also be stored in a computer or computer-readable memory that may direct a computer or other programmable data processing apparatus to function in a particular manner, such that the instructions stored in the computer or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that are executed on the computer or other programmable apparatus provide operations for implementing the functions specified in the flowchart block or blocks.

Further, each block of the flowchart illustrations and the like, may represent a module, segment, or portion of code, which comprises one or more executable instructions for implementing the specified logical function(s). It should also be noted that in some alternative implementations, the functions noted in the blocks may occur out of the illustrated order. For example, two blocks shown in succession may in fact be executed substantially concurrently or the blocks may sometimes be executed in a reverse order, depending upon the functionality involved.

The term "unit", as used herein, may refer to a software or hardware component or device, such as a field programmable gate array (FPGA) or application specific integrated circuit (ASIC), which performs certain tasks. A unit may be configured to reside on an addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units. In addition, the components and units may be implemented to drive one or more central processing units (CPUs) in a device or a secure multimedia card.

Figure 1B:
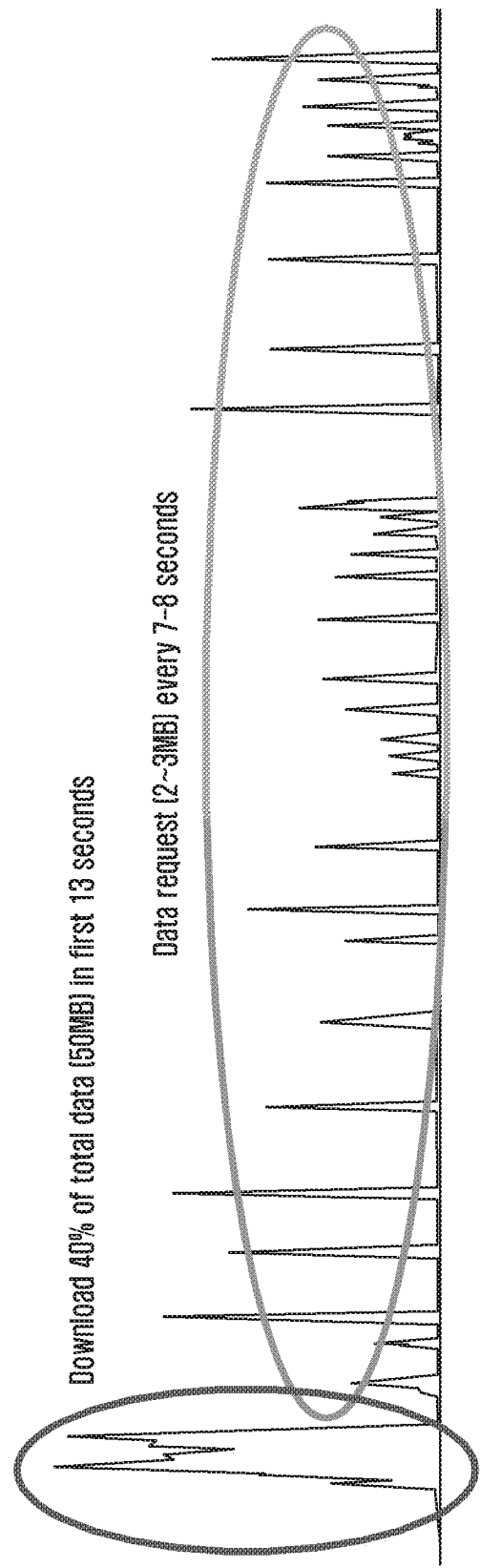

FIGS. 1A and 1B are diagrams illustrating a data reception pattern according to an embodiment of the present disclosure.

In the case of accessing a 5G network and receiving data, a terminal may receive a large amount of data in a short time because of an increase in data throughput and may also receive a seamless service even when using a service having a large amount of data such as playing a high-quality video. However, such an increase in data throughput may increase the amount of battery consumption of the terminal and may also reduce a service utilization time of the terminal.

Referring to FIG. 1A, a user of a terminal 101 may use applications such as those proving a high-quality video 102 and a messenger service 104. As described above, when the terminal 101 accesses the 5G network as a default radio access technology (RAT) and receives data, a seamless service may be provided. However, when a certain application such as a messenger service is used, a data amount (i.e., the amount of generated data) is not so large and thus, high data throughput is not required. Namely, in this case, battery consumption may be unnecessarily increased when the 5G network is used. Therefore, there is a need to select different access networks depending on the type of application and/or the characteristics of service.

However, typically the terminal processes data traffic through a default RAT, which is a predetermined basic network, and may change the accessed RAT (herein, also referred to as a network) only when the access becomes unstable. For example, a 5G terminal processes data traffic through a 5G network and may change the access to a 4G or a third generation (3G) network when the access to the 5G network becomes unstable. Therefore, because the terminal receives data through the 5G network regardless of the type of application or the characteristics of service, battery consumption may be unnecessarily increased.

For example, when a service provided to the terminal 101 is changed, such as when a user who is viewing a high-quality video 102 starts to use a messenger service 104 as shown in FIG. 1A, battery consumption may be unnecessarily increased if data is received from the same network.

Therefore, it is necessary to dynamically change a network accessed by the terminal 101 depending on a service used by the terminal.

In addition, even when the same application is used, the data amount may vary according to time. For example, in the case of playing a high-quality video as shown in the graph of FIG. 1B, the terminal may download 50 MB of data, corresponding to 40% of the total data, in the first 13 seconds, and then may request and download 2 to 3 MB of data every 7 to 8 seconds thereafter. Even in such a case, if the terminal receives data through the 5G network, the battery consumption of the terminal may increase. However, if data is downloaded by changing the access network after downloading data through the 5G network for the first 13 seconds, the battery consumption of the terminal may be reduced without deteriorating the quality of experience.

Therefore, it is necessary to dynamically change a network accessed by the terminal 101 depending on a pattern of data or traffic.

Accordingly, a method is provided for selecting a network having smaller battery consumption in consideration of an application type, a service type, a traffic pattern, and the like. Specifically, a method is provided for estimating a data amount or traffic amount in response to a data request of the terminal, calculating a battery consumption amount for processing the estimated data amount or traffic amount in each network, and selecting a network having the smallest battery consumption amount.

FIG. 2 is a diagram illustrating a method for a terminal to select a network according to an embodiment of the present disclosure.

A terminal 201 may include an application unit 203 and a controller 205, and may transmit a request for data to a server 207. A detailed configuration of the terminal 201 will be described below.

Referring to FIG. 2, the following describes a response to an event occurring that causes the terminal 201 to select a network. The network selection event may include a case where a data request occurs or a case where an application having a traffic history is driven, but embodiments are not limited thereto. The former case may indicate that a data request occurs in the server 207 through execution of an application. In addition, the traffic history may indicate a case where there is traffic occurring through execution of an application. For illustration, the occurrence of a data request will be described herein as an example of the network selection event.

Accordingly, when a data request occurs, the terminal 201 may be triggered to check whether the data request occurs and select a network. At operation S210, the application unit 203 of the terminal 201 may transmit a data request to the controller 205, and the controller 205 may identify the occurrence of the data request by checking whether the data request is received.

If the data request occurs, the terminal 201 may then estimate the amount of requested data at operation S220.

A method for estimating the data amount may use information included in a message transmitted by the application unit 203 at the time of data request. For example, the application unit 203 may transmit a hypertext transfer protocol (HTTP) close range request to the controller 205 for the data request, and a range value contained in the message may be used to estimate the amount of data to be received.

Alternatively, the terminal 201 may estimate the data amount by using metadata. For example, if a download is requested, the terminal 201 may previously check the amount of download traffic in the application before the download. Alternatively, in the case of video data, the terminal 201 may calculate the traffic amount by using a bit rate and a duration.

The data amount may include an amount of data requested in a single application or a sum of amounts of data requested in a plurality of applications. For example, in the terminal 201, a background application in addition to a foreground application may run together, and the foreground and background applications may be changed from time to time. The foreground application refers to an application used directly by the user, and the background application refers to an application that is running in the background of the terminal 201. For example, if the user activates a messenger service while watching a high-quality video, the messenger service may be the foreground application, and the high-quality video may be the background application. The user may also alternately use various applications of the terminal, whereby the foreground and background applications may be changed from time to time. However, since data may be continuously generated even in the background application, the terminal may estimate the sum of the amounts of data of the foreground and background applications.

Additionally, the terminal 201 may acquire traffic information at operation S220. The estimated data amount may be included in the traffic information. The traffic information may include at least one of the estimated data amount, the number of data requests, the amount of ready-to-receive data, or the amount of data accumulated in a buffer of the terminal 201.

Thereafter, the terminal 201 may calculate the amount of battery consumption at operation S230. Based on the estimated data amount, the terminal 201 may calculate the amount of battery consumption for each network. In general, when the same service is received through a 4G network and a 5G network, battery consumption may increase in the case of using the 5G network. However, when the data amount is large, battery consumption may decrease due to reduction of the reception time when data is received rapidly through the 5G network.

Therefore, the terminal 201 may calculate the amount of battery consumption by using the amount of current consumption in each network, based on the estimated data amount.

The terminal 201 may also calculate the amount of battery consumption for each network, based on the estimated data amount in a predetermined time section after the data request occurs. This can be performed since unnecessary network changes may occur when a network is selected according to the amount of data generated by a single data request, while the data amount increases sharply when a plurality of data requests occur for a short time. The terminal 201 may estimate the data amount by using information included in a data request history or a request message of the relevant application.

In order to calculate the amount of battery consumption for each network, the terminal 201 may use, for example, Equation 1 below.

$$\text{ConsumedEnergy\_RAT\#} = \text{ExpectedTrafficAmount}/ \text{RAT\#\_Thruput} \times \text{RAT\#\_Current Consumption} \quad \text{Equation 1}$$

In this case, the RAT# Thruput refers to a size of data that can be processed by the terminal for a given time, and the terminal may calculate the throughput by checking how many MBs are processed for how many seconds. Also, if there is no received data, the terminal may estimate the throughput by using the recently received data.

In addition, the amount of current consumption for each network (RAT# Current Consumption) may be stored in advance in the terminal.

Therefore, the terminal 201 may calculate the amount of battery consumption for each network according to the estimated data amount.

Thereafter, the terminal 201 may select an access network at operation S240. The terminal 201 may select a network having a minimum battery consumption amount according to the estimated data amount. Thus, if there is a network having lower battery consumption than that of the current access network, based on the estimated data amount, the terminal 201 may select and access the network having the lower battery consumption. Therefore, the terminal 201 may select or reselect a network even during an application service.

In addition, the terminal 201 may transmit a request for data to the server 207 at operation S250. In this case, the terminal 201 may access the selected network and transmit a data request to the server 207 of the network. In response to the data request, the terminal 201 may receive data from the server 207 at operation S260.

A hysteresis value may be set to prevent oscillation (or ping-ponging) between networks. Namely, if there has been a network selection or reselection within a predetermined time (such as "n" seconds), another network selection or reselection may not be performed, even though there is a network having lower battery consumption.

Alternatively, if there has been a network selection or reselection within a predetermined time (such as "n" seconds), the terminal may select or reselect a network only if the size difference of the requested data is equal to or greater than a threshold value. In this case, the threshold value may be predetermined or received from a base station (not shown). Namely, the terminal 201 may select or reselect a network only when a difference between the data amount estimated at the previous network selection or reselection and the currently estimated data amount is equal to or greater than the threshold value in Equation 2 below.

$$(\text{abs}(\text{diff}(\text{Expected\_Data\_Size at previous event}, \text{Expected\_Data\_Size at current event})) > \text{Threshold}) \quad \text{Equation 2}$$

However, even when the data request occurs and thereby the network selection event is triggered, the terminal 201 may not be able to estimate the amount of requested data. In the case of failing to know the data amount, the operation of the terminal 201 will be described with reference to FIG. 3.

Figure 3:
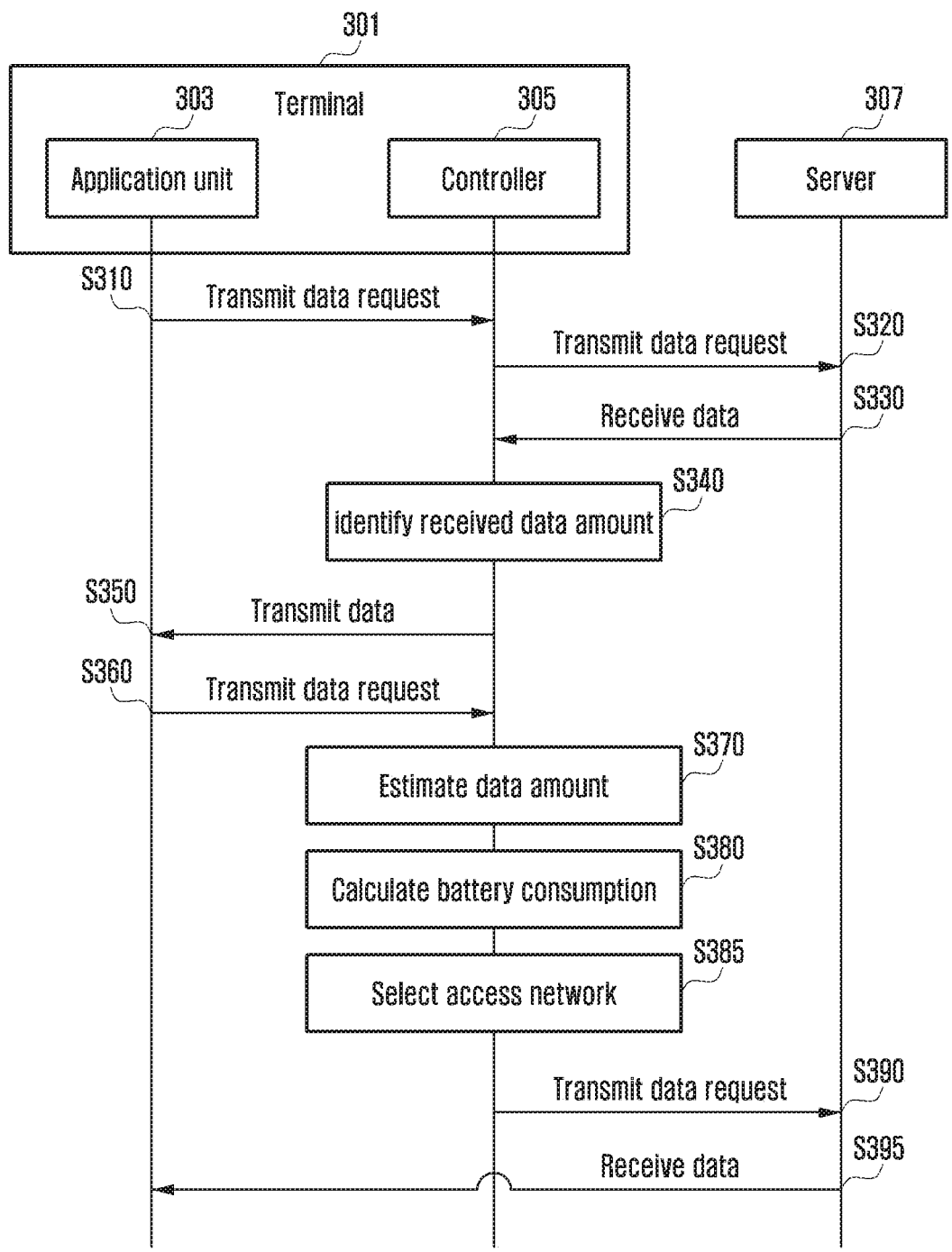
FIG. 3 is a diagram illustrating another method for a terminal to select a network according to an embodiment of the present disclosure.

FIG. 3 is a diagram illustrating another method for a terminal to select a network according to an embodiment of the present disclosure.

Referring to FIG. 3, the following describes a response to an event occurring that causes a terminal 301 to select a network. As discussed above, the network selection event may include a case where a data request occurs or a case where an application having a traffic history is driven, but embodiments are not limited thereto. The terminal 301 may include an application unit 303 and a controller 305, and may transmit a request for data to a server 307. A further detailed description will be omitted.

The terminal 301 may first check whether the data request occurs. Namely, at operation S310, the application unit 303 of the terminal 301 may transmit a data request to the controller 305, and the controller 305 may identify the occurrence of the data request by checking whether the data request is received.

In addition, the terminal 301 may transmit the data request to the server 307 at operation S320. If the data request occurs in the terminal 301 and if the terminal cannot estimate the amount of requested data, the terminal 301 may transmit the data request to the server 307 and then estimate the data amount for the subsequent data request by using received data.

Therefore, the terminal 301 may receive data from the server 307 at operation S330.

At operation S340, the terminal 301 may identify the amount of data received from the server 307. Specifically, the controller 305 of the terminal 301 may receive data from the server 307, identify and store the amount or size of the received data. Thus, based on the amount or size of the data, the terminal 301 may estimate the data amount for a subsequent data request. In addition, at operation S350, the controller 305 of the terminal 301 may transmit the data received from the server 307 to the application unit 303.

In the case of failing to estimate the amount of requested data, the terminal 301 may estimate the data amount by using the past data average value of the application that transmits the data request. In the case of estimating the data amount in this way, the terminal 301 may omit operations S310 to S350 and estimate the data amount immediately in response to the data transmission request of operation S360.

Thereafter, when a data request occurs, the application unit 303 of the terminal 301 may transmit the data request to the controller 305 at operation S360.

In addition, at operation S370, the terminal 301 may estimate the amount of requested data. As described above, the terminal 301 may estimate the amount of requested data, based on the amount of data previously received. At this time, the data amount estimated by the terminal 301 may include the sum of the amounts of data requested in a single application or a plurality of applications. Also, the terminal 301 may estimate the data amount in a predetermined time section. The details are the same as those described above, and further description is therefore omitted.

Additionally, the terminal 301 may additionally acquire traffic information at operation S370. In this case, the estimated data amount may be included in the traffic information. The traffic information may include at least one of an estimated data amount, a number of data requests, an amount of ready-to-receive data, and an amount of data accumulated in a buffer (not shown) of the terminal 301.

In addition, the terminal 301 may calculate the amount of battery consumption at operation S380. The terminal 301 may calculate the amount of battery consumption for each network. At this time, based on the estimated data amount, the terminal 301 may calculate the amount of battery consumption for each network. The details are the same as those described above, and further description is therefore omitted.

At operation S385, the terminal 301 may select an access network. The terminal 301 may select a network having a minimum battery consumption amount according to the estimated data amount. Thus, if there is a network having lower battery consumption than that of the current access network, based on the estimated data amount, the terminal 301 may select and access the network having lower battery consumption. Therefore, the terminal 301 may select or reselect the network even during an application service.

As noted above, a hysteresis value may be set to prevent oscillation (or ping-ponging) between networks. Namely, if there has been a network selection or reselection within a predetermined time (such as "n" seconds), another network selection or reselection may not be performed, even though there is a network having lower battery consumption.

Alternatively, if there has been a network selection or reselection within a predetermined time (such as "n" seconds), the terminal 301 may select or reselect a network only if the size difference of the requested data is equal to or greater than a threshold value. In this case, the threshold value may be predetermined or received from a base station (not shown). Namely, the terminal 301 may select or reselect a network only when a difference between the data amount estimated at the previous network selection or reselection and the currently estimated data amount is equal to or greater than the threshold value in Equation 3 below.

$$(abs(diff(Expected\_Data\_Size\ at\ previous\ event, Expected\_Data\_Size\ at\ current\ event))>Threshold) \quad \text{Equation 3}$$

The terminal 301 may transmit a request for data to the server 307 at operation S390. In this case, the terminal 301 may access the selected network and request data from the server 307 of the network. In response to the data request, the terminal 301 may receive data from the server 307 at operation S395.

Hereinafter, each operation will be described in detail.

Figure 4A:
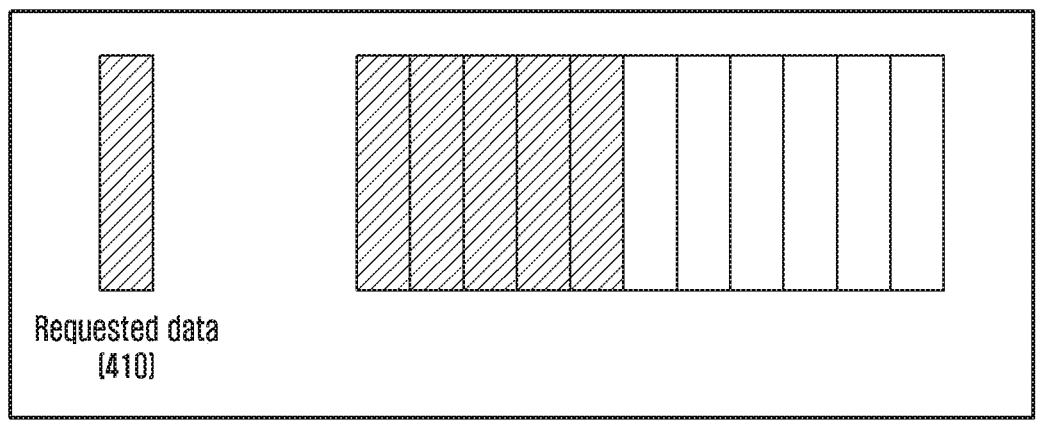
FIGS. 4A and 4B are diagrams illustrating a method for estimating a requested data amount according to an embodiment of the present disclosure.
Figure 4B:
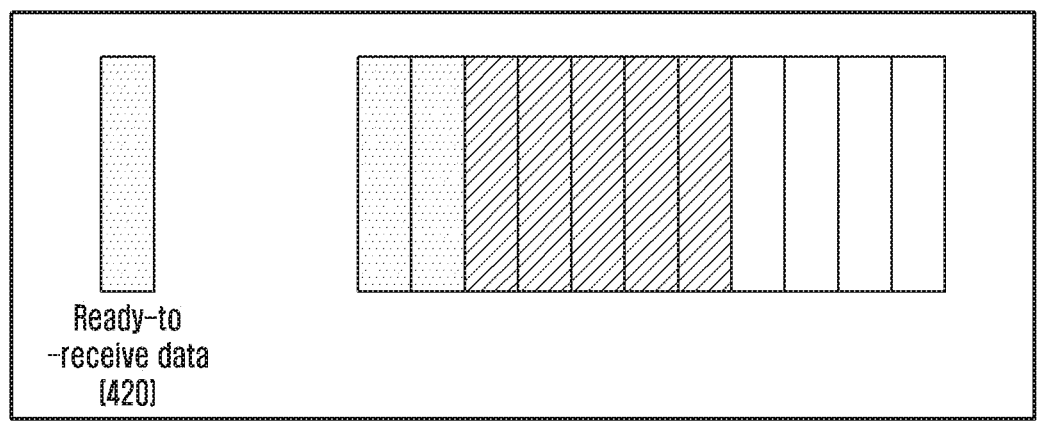

FIGS. 4A and 4B are diagrams illustrating a method for estimating a requested data amount according to an embodiment of the present disclosure.

Referring to FIG. 4A, when estimating an amount of requested data, a terminal such as 101, 201 and 301, may estimate only the amount of currently requested data 410. Therefore, the terminal may estimate the amount of data to be generated according to the request, calculate the amount of battery consumption for each network on the basis of the data amount, and select a network accordingly.

Referring to FIG. 4B, when estimating an amount of requested data, the terminal such as 101, 201 and 301, may estimate the data amount by summing the amount of currently requested data 410 and the amount of ready-to receive data 420.

When the terminal transmits a data request, some of the data according to the previous data request may not be received. Therefore, the terminal may estimate the data amount by summing the ready-to-receive data by the previous request and the data to be generated according to the current data request. At this time, the ready-to-receive data may include ready-to-receive data for all applications running in the terminal.

Therefore, as shown in FIG. 4B, the terminal may estimate the data amount by adding the amount of currently requested data 410 and the amount of ready-to receive data 420, and may select a network on the basis of the estimated result.

In this way, the terminal may select an access network, based on the amount of network traffic before and after the data request of the application occurs.

Figure 5A:
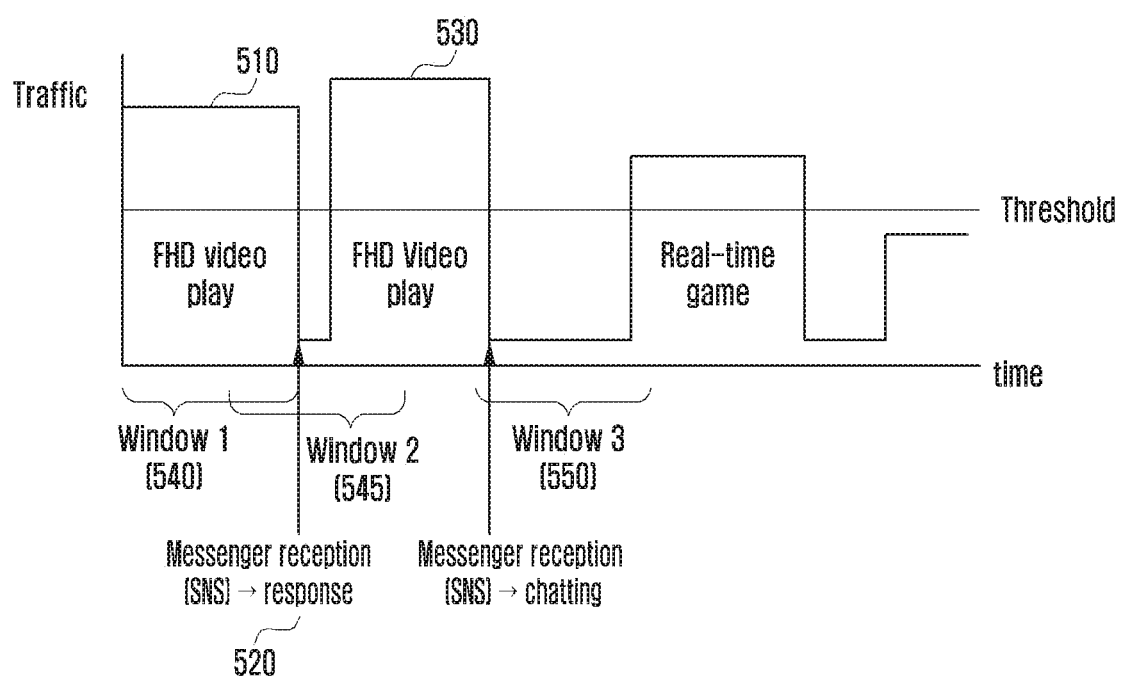
FIGS. 5A and 5B are diagrams illustrating another method for estimating a requested data amount according to an embodiment of the present disclosure.
Figure 5B:
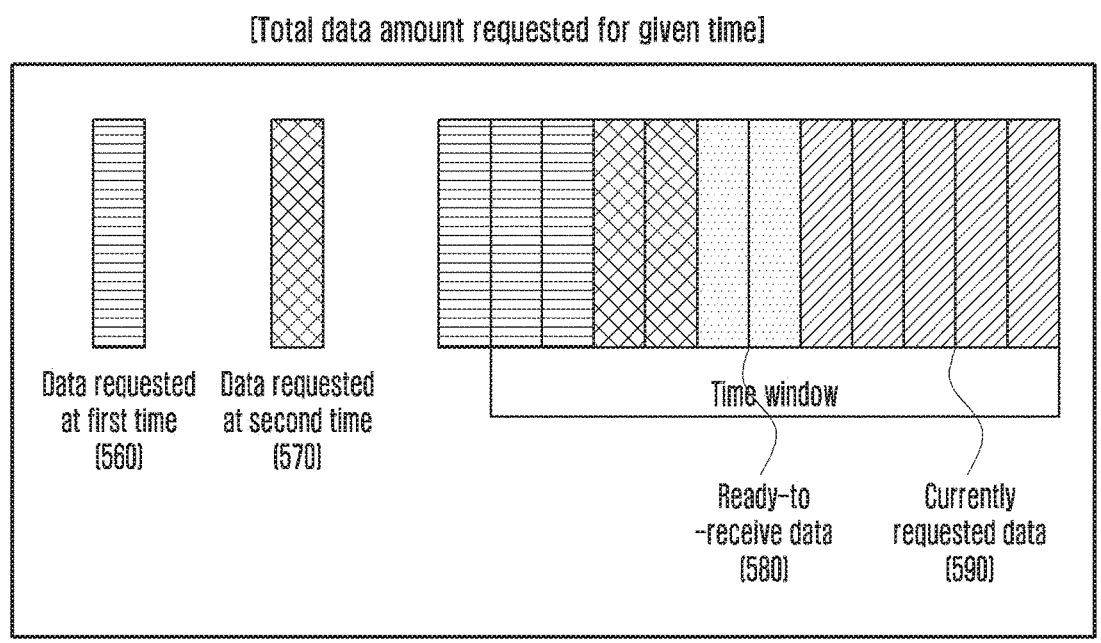

FIGS. 5A and 5B are diagrams illustrating another method for estimating a requested data amount according to an embodiment of the present disclosure.

Referring to FIG. 5A, a user may use a plurality of applications in a terminal such as 101, 201 and 301, and may change a running application at any time. For example, the user may play a high-quality video at 510 and then receive a message (e.g., a text message or a social networking site (SNS) service), thereby stopping the high-quality video and replying at 520 to the message. In this case, the data amount may be reduced sharply while replying to the message, and the data amount estimated by the terminal regarding the data request for the messenger service may also be reduced sharply. The user may then replay at 530 the high-quality video after replying, and the data amount may increase rapidly. Likewise, the data amount estimated by the terminal to view the high-quality video may also be rapidly increased.

If the network is selected on the basis of the data amount estimated by the data request when applications running in the terminal are severely changed as described above, a situation of having to change the network so as to use the messenger service for a short time may arise. If the network change occurs frequently, the battery consumption of the terminal may increase.

Thus, a method is provided for estimating the amount of requested data for a predetermined time and then selecting an access network based on the amount of requested data for the predetermined time. Hereinafter, the predetermined time may be referred to as a time window, and the terminal such as 101, 201 and 301, may estimate the data amount by sliding the time window. Then, by using the amount of requested data for the predetermined time, the terminal may calculate the terminal battery consumption amount for each network and select the network having the lowest terminal battery consumption amount.

In this case, the amount of requested data for a predetermined time may refer to a sum of the amount of data generated by the data request for the predetermined time and the amount of ready-to-receive data, but embodiments are not limited thereto.

For example, as shown in FIG. 5A, the terminal may calculate the amount of battery consumption for each network by using the data amount estimated in a first window 540, and also calculate the amount of battery consumption for each network by using the data amount estimated in a second window 545. In this case, the amount of traffic decreases rapidly for a short time due to the messenger service, but the terminal may receive data through the same network because the overall data amount does not change significantly.

However, the data amount estimated in a third window 550 may be drastically reduced as compared with before, and the battery consumption amount for each network calculated by using this may also be changed. Therefore, when there is a network having lower battery consumption, the terminal may change the network and receive data.

Alternatively, the terminal such as 101, 201 and 301, may estimate the amount of requested data for a predetermined time and select the network based on a threshold. For example, the terminal may select a 5G network if the amount of requested data exceeds a threshold for a predetermined time. The threshold may be predetermined or received from a base station (not shown).

For example, in FIG. 5A, the data amount estimated in the first window 540 and the data amount estimated in the second window 545 may exceed a threshold, and the terminal may receive data through the 5G network.

However, the data amount estimated in the third window 550 may be smaller than the threshold, and the terminal may change the network to receive data.

As discussed above, by using the time window, unnecessary network changes may be reduced.

Referring to FIG. 5B, based on the time window, an amount of requested data 560 at a first time, an amount of requested data 570 at a second time, an amount of ready-to-receive data 580, and an amount of currently requested data 590 may be included in the data amount estimated by the terminal. In addition, when the time window slides, the amount of data requested at the first time and the amount of data requested data at the second time may be excluded, respectively, and the amount of data requested thereafter may be further included. The details are the same as those described above, and further description is therefore omitted.

Figure 6:
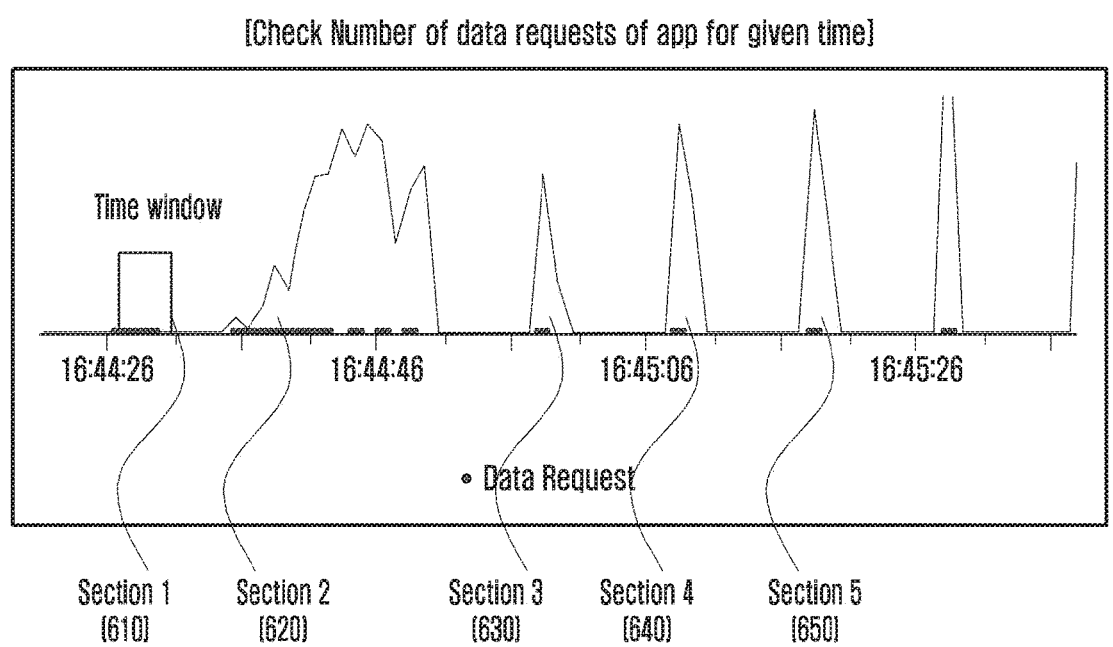
FIG. 6 is a diagram illustrating still another method for estimating a requested data amount according to an embodiment of the present disclosure.

FIG. 6 is a diagram illustrating still another method for estimating a requested data amount according to an embodiment of the present disclosure.

Referring to FIG. 6, a terminal such as 101, 201 and 301, may select a network based on a number of data requests for a predetermined time. In this embodiment, the predetermined time may also be referred to as a time window, and the terminal may identify the number of data requests while sliding the time window.

If the terminal frequently requests data, the amount of data increases. However, if the terminal does not request data frequently, the amount of data may decrease.

Accordingly, the terminal may identify the number of data requests in the time window and select the network based on the number of data requests.

Referring to FIG. 6, a number of data requests is large in a first section 610 and in a second section 620, whereas a number of data requests is small in a third section 630, a fourth section 640, and a fifth section 650. Because data occurs by the data request as described above, the terminal may estimate that the amount of data is large when the number of data requests is large. Therefore, when the number of data requests identified in the time window is greater than the threshold, the terminal may select a 5G network. However, if the number of data requests in the time window is smaller than the threshold, the terminal may select another network.

Figure 7A:
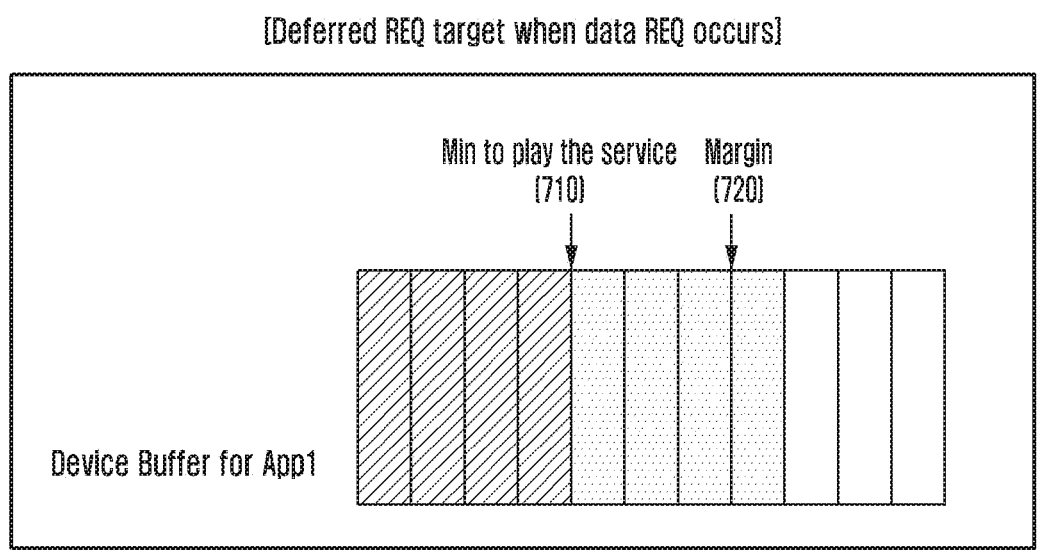
FIGS. 7A and 7B are diagrams illustrating a time point at which data is transmitted to a server according to an embodiment of the present disclosure.
Figure 7B:
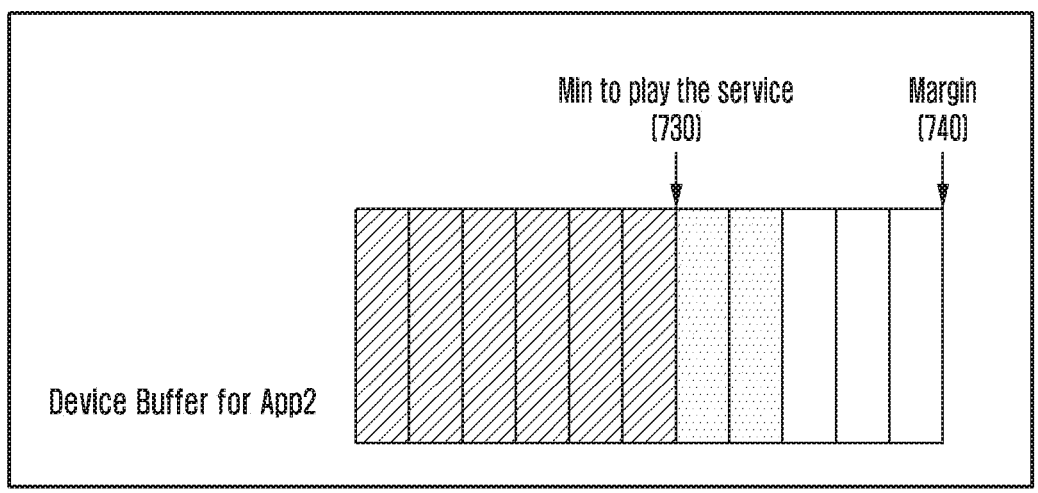

FIGS. 7A and 7B are diagrams illustrating a time point at which data is transmitted to a server according to an embodiment of the present disclosure.

When a data request occurs in an application unit, a controller of a terminal such as 101, 201 and 301, may select a network by estimating an amount of data and transmit the data request to a server such as 207 and 307. However, if there is a margin in a reception buffer (not shown) of the terminal, the terminal may collect the data requests within a limit not resulting in lowering the quality of experience, and then transmit the data requests to the server all at once. In the present disclosure, this may be referred to as a deferred request.

Referring to FIG. 7A, a service minimum value 710 indicates a minimum data amount for playing a service, and a margin value 720 indicates an amount of spare data for avoiding deterioration in service quality due to a transmission time delay. That is, the service may be played when the buffer accumulates data by the service minimum value 710, and the terminal may request data from the server up to the margin value 720. In this case, the margin value may be determined on the basis of the service minimum value (e.g., a certain percentage (%) of the service minimum value).

If there is a margin in the amount of data received in the reception buffer, that is, in the amount of buffered data, the terminal may collect data requests and transmit them to the server all at once. This is because the amount of data stored in the buffer is sufficient so that the service quality does not deteriorate even if the data is not requested as soon as the data request occurs.

Specifically, the terminal may identify an amount of buffered data for each application and compare the amount of buffered data with an application-specific threshold value. If the amount of buffered data for each application is greater than the threshold value, the terminal may perform the above operation.

The terminal may also compare an amount of data required for playing the service with an amount of data currently accumulated in the buffer of the terminal. If there is a large amount of data accumulated in the buffer, the terminal may collect data requests and then transmit them all at once. Specifically, if the amount of data stored in the buffer is greater than the minimum data amount for driving the service plus the margin value, the terminal may collect and transmit the data request.

Alternatively, if the number of data requests of the application for a given time is smaller than a predetermined value, the terminal may collect the data requests and transmit them all at one time. While identifying the number of data requests of a single application from a past specific time to the present time, the terminal may collect data requests until the number of data requests becomes greater than a predetermined value, and then may transmit the data requests all at one time.

Specifically, FIG. 7A illustrates an example of transmitting a delayed request when a data request occurs.

Even when a data request occurs from the application, the terminal may transmit a delayed request if the amount of data currently accumulated in the buffer is greater than the margin value 720. As described above, if the amount of data accumulated in the buffer is greater than the margin value, deterioration in service quality is not caused due to a margin for the amount of data stored in the buffer even though the data is not requested as soon as the data request occurs.

FIG. 7B illustrates an example of transmitting a data request to a server as soon as the data request occurs.

Referring to FIG. 7B, a service minimum value 730 indicates a minimum data amount for playing a service, and a margin value 740 indicates an amount of spare data for avoiding deterioration in service quality due to a transmission time delay. If the amount of data accumulated in the buffer is smaller than the margin value 740, the terminal may transmit a data request to the server as soon as the data request occurs. That is, since the amount of data accumulated in the buffer is not so large, the terminal may transmit a data request to the server immediately in response to the occurrence of the data request in order to prevent deterioration of service quality.

As described above, the terminal may collect data requests for a specific time and transmit them to the server all at one time. In addition, the terminal may select the network based on the data amount estimated according to the data request. By integrating the data reception sections in this way, the terminal may reduce battery consumption.

Figure 8:
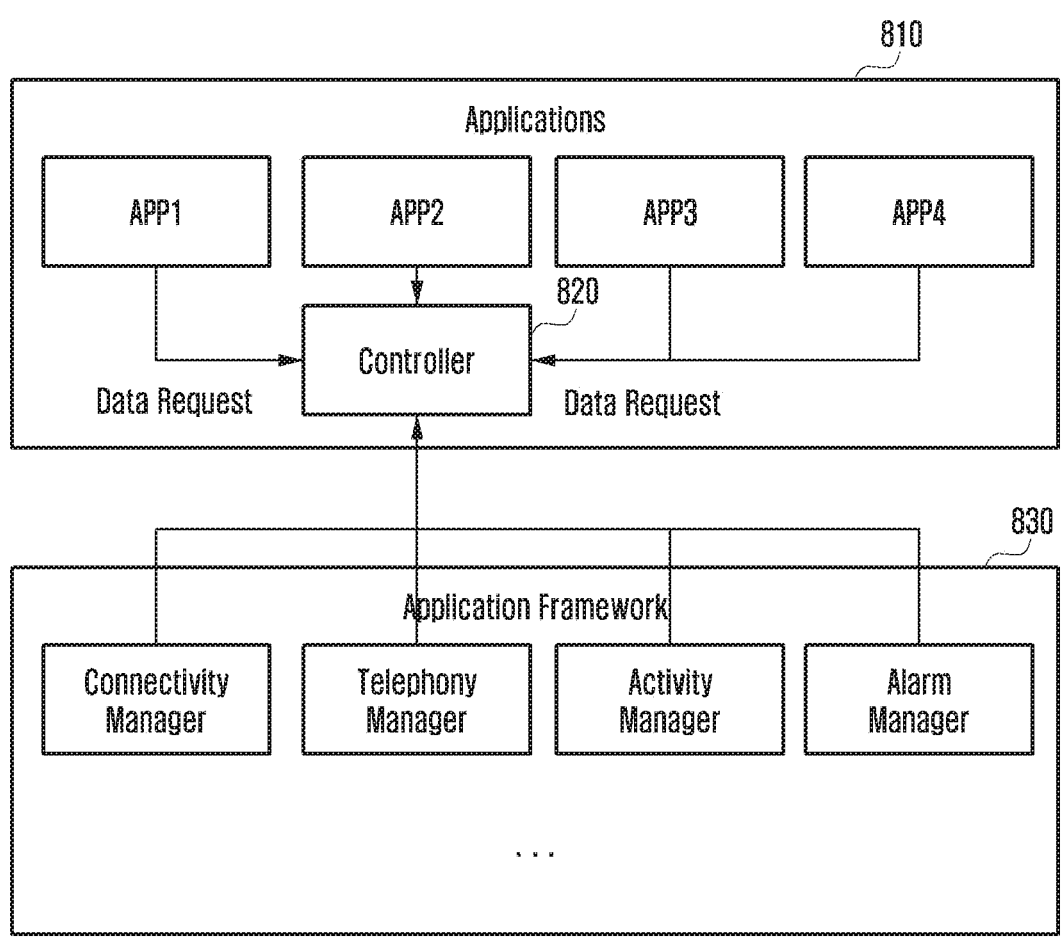
FIG. 8 is a diagram illustrating a configuration of a terminal according to an embodiment of the present disclosure.

FIG. 8 is a diagram illustrating a configuration of a terminal according to an embodiment of the present disclosure.

Referring to FIG. 8, a terminal such as 101, 201 and 301, may include an application unit 810, a controller 820, and an application framework 830. For example, when defining a controller in the specification, it may be stated that "the controller may be a circuit, an application-specific integrated circuit or at least one processor."

Although not shown, the terminal of the present disclosure may include a transceiver, a storage unit or memory, a display, and an input unit.

The transceiver of the terminal may transmit and receive a signal to and from a server or base station. The transceiver may also transmit a data request to the server and receive data from the server. In addition, the storage unit may store information generated by the controller according to the present disclosure.

The application unit 810 may include a plurality of applications APP1, APP2, APP3, APP4 and the like, that can be running in the terminal. Therefore, when an application of the terminal is executed, the application unit may transmit a data request to the controller 820.

The controller 820 may control operations of the embodiments of the present disclosure described herein. The controller 820 may be included in the application unit 810, and include a plurality or processors.

The controller 820 may receive a data request according to the execution of an application and thus determine whether a data request occurs. In addition, the controller 820 may receive information necessary for executing the application through the application framework 830. Therefore, when a data request occurs, a network selection event may be triggered, and the controller 820 may select an appropriate network.

Specifically, the controller 820 may estimate the amount of requested data. The controller 820 may estimate the amount of data to be received by using metadata or a range value included in a HTTP close range request received from the application unit 810. The details are the same as those described above.

The data amount may also include the amount of data currently requested, the sum of the amount of ready-to-receive data and the amount of currently requested data, the amount of data estimated in the time window, and the like. The data amount may also include the sum of the amounts of plurality of data. The details are the same as those described above, and further description is therefore omitted.

In addition, the controller 820 may acquire traffic information. The estimated data amount may be included in the traffic information. The traffic information may also include at least one of the estimated data amount, the number of data requests, the amount of ready-to-receive data, and the amount of data accumulated in a buffer of the terminal.

In addition, the controller 820 may calculate the amount of battery consumption. Based on the estimated data amount, the controller 820 may calculate the amount of battery consumption for each network. Thus, the controller 820 may select an access network. Using the calculated amount of battery consumption for each network, the controller 820 may select a network having the minimum battery consumption amount.

In addition, the controller 820 may access the network, transmit a data request to the server, and receive data from the server. Then, the controller 820 may transmit the received data to the application unit 810.

In the case of failing to estimate the data amount, the controller 820 may request data from the server to receive data without estimating the data amount. Therefore, the controller 820 may identify information of the received data (e.g., the amount or size of the received data), store the information in the storage unit, and use the stored information to estimate the data amount in response to a subsequent data request.

Accordingly, when a data request occurs afterwards, the controller 820 may estimate the data amount, calculate the amount of battery consumption for each network, and select a network having the minimum battery consumption. Thus, if there is a network having lower battery consumption than that of the current access network, based on the estimated data amount, the controller 820 may select and access the network having lower battery consumption. Therefore, the controller 820 may select or reselect the network even during an application service.

In addition, the controller 820 may identify the number of data requests in a predetermined section (e.g., a reception window) instead of the data amount, and may select the network using the number of data requests.

A hysteresis value may also be set to prevent oscillation (or ping-ponging) between networks. Namely, if there has been a network selection or reselection within a predetermined time (such as "n" seconds), the controller 820 may not select or reselect another network even though there is a network having lower battery consumption.

Alternatively, if there has been a network selection or reselection within a predetermined time (such as "n" seconds), the controller 820 may select or reselect a network only if the size difference of the requested data is equal to or greater than a threshold value. In this case, the threshold value may be predetermined or received from a base station (not shown). Namely, the controller 820 may select or reselect a network only when a difference between the data amount estimated at the previous network reselection and the currently estimated data amount is equal to or greater than the threshold value in Equation 4 below.

$$(\text{abs}(\text{diff}(\text{Expected\_Data\_Size at previous event}, \text{Expected\_Data\_Size at current event})) > \text{Threshold}) \quad \text{Equation 4}$$

In addition, the controller 820 may control other operations of the terminal described in the present disclosure.

The application framework 830 may transmit information necessary for driving the application to the controller 820.

As proposed in the present disclosure, the controller 820 may estimate the amount of data and select the network through this, thereby increasing the battery efficiency of the terminal.

While the present disclosure has been shown and described with reference to various embodiments thereof, it will be understood by those skilled in the art that various changes in form and detail may be made therein without departing from the spirit and scope of the present disclosure as defined by the appended claims and their equivalents.

What is claimed is:
1. A method of controlling a terminal, the method comprising:
   identifying whether a data request occurs;
   estimating a data amount based on a data amount previously received from a server, when the data request occurs;

calculating an amount of battery consumption for each access network of a plurality of access networks based on the estimated data amount;

selecting an access network, from among the plurality of access networks, having a smallest amount of battery consumption; and transmitting the data request to the server according to the selected access network.

2. The method of claim 1, wherein the estimating of the data amount comprises estimating the data amount using at least one of information included in a message for the data request or metadata of requested data.

3. The method of claim 1, wherein the estimating of the data amount further comprises:

when the estimating of the data amount fails, transmitting the data request to the server;

receiving data from the server; and estimating a data amount for a subsequent data request by using the received data.

4. The method of claim 1, wherein the estimated data amount includes at least one of an amount of data requested in a single application or a sum of amounts of data requested in a plurality of applications, and wherein the estimating of the data amount further comprises estimating, when failing to estimate the data amount, the data amount by using a data average value of an application that transmits the data request.

5. The method of claim 4, wherein the estimated data amount includes at least one of a currently data amount, a sum of the currently data amount and a ready-to-receive data amount, or an amount of data requested for a predetermined time, with regard to the single application or the plurality of applications.

6. The method of claim 1, wherein the calculating of the amount of battery consumption of each access network comprises calculating $$ConsumedEnergy\_RAT\# = ExpectedTrafficAmount/RAT\#\_Thruput \times RAT\#\_Current\ Consumption,$$

and wherein the RAT# Thruput is a size of data that can be processed by the terminal for a given time.

7. The method of claim 1, wherein the estimating of the data amount further comprises:

identifying a number of data requests that occur for a predetermined time; and selecting the access network based on the identified number of data requests.

8. The method of claim 1, further comprising:

wherein a time of transmitting the data request is determined based on an amount of data required for a service and an amount of data accumulated in a buffer.

9. The method of claim 8, wherein the time of transmitting the data request is delayed when the amount of data required for the service is greater than a sum of the amount of data accumulated in the buffer and a margin value.

10. The method of claim 1, wherein the plurality of access networks includes two or more of a third generation (3G) network, a fourth generation (4G) network, or a fifth generation (5G) network.

11. A terminal comprising:

a transceiver; and at least one processor configured to:

identify whether a data request occurs, estimate a data amount based on a data amount previously received from a server, when the data request occurs, calculate an amount of battery consumption for each access network of a plurality of access networks based on the estimated data amount, select an access network, from among the plurality of access networks, having a smallest amount of battery consumption, and transmit, via the transceiver, the data request to the server according to the selected access network.

12. The terminal of claim 11, wherein the at least one processor is further configured to estimate the data amount by using at least one of information included in a message for the data request or metadata of requested data.

13. The terminal of claim 11, wherein the at least one processor is further configured to:

when the estimating of the data amount fails, transmit the data request to the server, receive data from the server, and estimate a data amount for a subsequent data request by using the received data.

14. The terminal of claim 11, wherein the estimated data amount includes at least one of an amount of data requested in a single application or a sum of amounts of data requested in a plurality of applications, and wherein the at least one processor is further configured to estimate, when failing to estimate the data amount, the data amount by using a data average value of an application that transmits the data request.

15. The terminal of claim 14, wherein the estimated data amount includes at least one of a currently requested data amount, a sum of the currently requested data amount and a ready-to-receive data amount, or an amount of data requested for a predetermined time, with regard to the single application or the plurality of applications.

16. The terminal of claim 11, wherein the at least one processor is further configured to calculate the amount of battery consumption of each access network by calculating $$ConsumedEnergy\_RAT\# = ExpectedTrafficAmount/RAT\#\_Thruput \times RAT\#\_Current\ Consumption,$$

and wherein the RAT# Thruput is a size of data that can be processed by the terminal for a given time.

17. The terminal of claim 11, wherein the at least one processor is further configured to:

identify a number of data requests that occur for a predetermined time, and select the access network based on the identified number of data requests.

18. The terminal of claim 11, wherein a time of transmitting the data request is determined based on an amount of data required for a service and an amount of data accumulated in a buffer.

19. The terminal of claim 18, wherein the time of transmitting the data request is delayed when the amount of data required for the service is greater than a sum of the amount of data accumulated in the buffer and a margin value.

20. The terminal of claim 11, wherein the plurality of access networks includes two or more of a third generation (3G) network, a fourth generation (4G) network, or a fifth generation (5G) network.

* * * * *